United States Patent [19]

Ohta

[11] Patent Number: 4,682,322
[45] Date of Patent: Jul. 21, 1987

[54] DISK CARTRIDGE
[75] Inventor: Teruo Ohta, Miyagi, Japan
[73] Assignee: Sony Corporation, Tokyo, Japan
[21] Appl. No.: 865,002
[22] Filed: May 20, 1986
[30] Foreign Application Priority Data May 20, 1985 [JP] Japan .......................... 60-074915[U]

[51] Int. Cl.⁴ .......................... G11B 25/04; G11B 7/00
[52] U.S. Cl. .................................... 369/291; 206/312;
206/444; 360/133; 369/273; 369/77.2
[58] Field of Search ...................... 369/291, 273, 77.2;
206/312, 444; 360/133, 99, 87

[56] References Cited

U.S. PATENT DOCUMENTS

| 4,503,474 | 3/1985 | Nigam | 360/133 |
| 4,511,944 | 4/1985 | Saito | 206/444 |
| 4,614,990 | 9/1986 | Saito | 206/312 |

FOREIGN PATENT DOCUMENTS 58-57685   4/1983   Japan .................................... 360/133

Primary Examiner—Steven L. Stephan
Attorney, Agent, or Firm—Lewis H. Eslinger; Alvin Sinderbrand

[57] ABSTRACT

In a disk cartridge, wherein a disk is accommodated in a cartridge, a first rack and a second rack are so provided as to be movable along respective sides of the cartridge, which are perpendicular to each other, a transmission mechanism links the first rack with the second rack, a shutter is secured to the second rack, and at least recording head or reproducing head insertion openings of the cartridge are opened and closed by the shutter as the second rack is moved by the first rack, the transmission mechanism comprises an eccentric pin provided on a first pinion meshed with the first rack, a second pinion meshed with a third rack fixed to the cartridge and the second rack, and a rod connecting the eccentric pin with the shaft of the second pinion, so that the stroke of the shutter can be made much larger without changing the stroke of the first rack or the size of the cartridge.

6 Claims, 5 Drawing Figures

DISK CARTRIDGE

BACKGROUND OF INVENTION

1. Field of the Invention

This invention relates to a disk cartridge including a disk for recording and/or reproducing, and more particularly though not exclusively to a disk cartridge including a writable disk, such as an optical disk or the like.

2. Description of the Prior Art

A disk cartridge disclosed in a prior application, "Japanese Utility Model Registration Application No. 59-138278" filed by the applicant of the present application, will be discribed referring to FIGS. 1 and 2.

As illustrated in FIG. 1, a writable disk 1, one of the recording mediums, such as an optical disk or the like is rotatably accommodated in an almost square-shaped cartridge 4 made of synthetic resin, such as polycarbonate resin or the like and comprising an upper half 2 and a lower half 3.

Turn table insertion circular openings 5 are provided in the respective centers of the upper half 2 and lower half 3. Optical head insertion openings 6 are so provided as to extend from the center toward one of the four sides of the cartridge 4, and covered by a shutter 7 made of a metal plate, such as a stainless steel plate or the like and in the shape of almost the letter "U" in cross section. The upper half 2 and lower half 3 are combined in one with screws 8.

As the disk cartridge is horizontally inserted into a disk player in direction of arrow a from the side near the optical head insertion openings, a projection 9 disposed within the disk player is inserted into a side groove 10 provided along one side 4a of the cartridge 4 in direction of arrow b. Then, a first rack 11 is slidingly moved in the direction of arrow b from the returned position indicated in chain-dotted lines to the advanced position indicated in solid lines in FIG. 2 against the force of a return spring, so that the shutter 7 is moved in direction of arrow c from the closed position indicated in chain-dotted lines to the opened position indicated in solid lines along another side 4b perpendicular to the side 4a of the cartridge 4 so as to open the optical head insertion openings 6.

As the disk cartridge is horizontally ejected from the disk player in direction of arrow d so as to separate the projection 9 from the first rack 11 in direction of arrow e, the first rack 11 is moved in direction of arrow e to the returned position indicated in chain-dotted lines due to the force of the return spring and simultaneously, the shutter 7 is moved in direction of arrow f to the closed position indicated in chain-dotted lines.

As illustrated in FIG. 2, a second rack 12 is so provided as to be slidingly movable in the directions of arrows c and f along the side 4b of the cartridge 4 and linked to the first rack 11 by a transmission mechanism 16 comprising two pinions 13, 15 and one intermediate gear 14, all of which are rotatably mounted in the cartridge 4. A torsion spring 19 used as a return spring is attached to the intermediate gear 14, so that the racks 11 and 12 are urged in the respective directions of arrows e and f by the force of the return spring 19. Thus, the second rack 12 is slidingly moved in the direction of arrow c along the guide shaft 17, as the first rack 11 is moved by the projection 9 in the direction of arrow b against the force of the return spring 19.

As the shutter 7 in the prior art covers only the optical head insertion openings 6 of the cartridge 4, the turn table insertion openings 5 of the cartridge 4 are always left opened, so that dust or the like easily enters in the cartridge through the turn table insertion openings 5 and adheres to the surface of the disk, and it causes a serious problem that recording and/or reproducing of the disk 1 are made incomplete due to the so-called dropout.

In the disk cartridge of this sort, the width $l_2$ of the optical head insertion opening 6 is generally smaller than the width (the diameter) $l_1$ of the turn table insertion opening 5, so that the width $l_3$ of the shutter 7 for covering only the optical head insertion opening 6, is made so small as to become the width $l_2$ of the optical head insertion opening 6, and the stroke $l_4$ of the shutter is also made small. Thus, the stroke $l_4$ necessary for the shutter 7 to close and open the optical head insertion opening 6 is obtained, even when the stroke $l_5$ of the first rack 11 is not magnified by the transmission mechanism 16.

Therefore, if it is intended that the shutter 7 is extended so that the turn table insertion openings 5 may be covered by the shutter 7 together with the optical head insertion openings 6, in order to prevent dust or the like from externing in the cartridge 4 through the turn table insertion openings 5, it becomes necessary to make the width $l_3$ of the shutter 7 so large as to become the width $l_1$ of the turn table insertion opening 5 and as an inevitable consequence, the stroke $l_4$ of the shutter 7 must be also made larger.

In the prior art, the transmission mechanism 16 connecting the first rack 11 with the second rack 12, however, comprises two pinions 13, 15 and one gear 14 and as the result, the stroke of the second rack 12 is always the same as the stroke $l_5$ of the first rack 11, so that the stroke $l_4$ of the shutter is not made large with the transmission mechanism 16 disclosed in the prior art.

Of course, the stroke $l_4$ of the shutter 7 in the prior art can be made larger, when the stroke $l_5$ of the first rack 11 is made large and further, the size of the cartridge 4 is made large so as to make the pinions 13, 15 and gear 14 large, but the stroke $l_5$ of the first rack 11 defined by the projection 9 and size of the cartridge 4 are dependent on the disk player, so that it is impossible to make the stroke $l_4$ of the shutter 7 larger through the means above-mentioned.

OBJECTS AND SUMMARY OF THE INVENTION

In a disk cartridge, wherein a disk used as a recording medium is accommodated in a cartridge comprising an upper half and a lower half, a first rack and a second rack are so provided as to be slidingly movable along respective sides of the cartridge, which are perpendicular to each other, a transmission mechanism provided within the cartridge links the first rack with the second rack, a shutter is secured to the second rack, and at least recording head or reproducing head insertion openings of the cartridge are opened and closed by the shutter, as the second rack is moved by the first rack operated by an external force through the transmission mechanism, the transmission mechanism of the present invention comprises a third rack so fixed in the cartridge as to be parallel to and opposite to the second rack, a second pinion meshed with both the second rack and third rack and moved along the fixed third rack, a first pinion meshed with the first rack, rotatably mounted in the cartridge, and having an eccentric pin, and a rod connecting the shaft of the second pinion meshed with the second rack and third rack with the eccentric pin. After all, the transmission mechanism of the present invention includes the second pinion meshed with both the fixed third rack and movable second rack and reciprocated by the crank mechanism, so that the stroke of the shutter becomes almost twice as large as the stroke of the first rack. Therefore, the stroke of the shutter can be made large even when it is the same as the stroke of the first rack in the prior art. And the stroke of the shutter is made larger even when the diameter of the pinion and the length of the third rack are much diminished, so that the transmission mechanism does not occupy a large space and thereby, the size of the cartridge can be the same as that in the prior art. Therefore, it is easy to enable the shutter to be moved in a large extent without making the stroke of the first rack and the size of the cartridge larger. Thus, the completely closed disk cartridge can be presented by the use of the large shutter capable of closing both the head insertion openings and turn table insertion openings of the cartridge simultaneously.

Further in the present invention, the eccentric pin of the first pinion and the shaft of the second pinion are connected with each other by the rod, so that the motion of the second rack is automatically adjusted to that of the first rack whenever the first rack and the first pinion are so meshed with each other as to be in phase. Therefore, it becomes easy to assemble the disk cartridge.

DETAILED DESCRIPTION OF A PREFERRED EMBODIMENT

Figure 1:
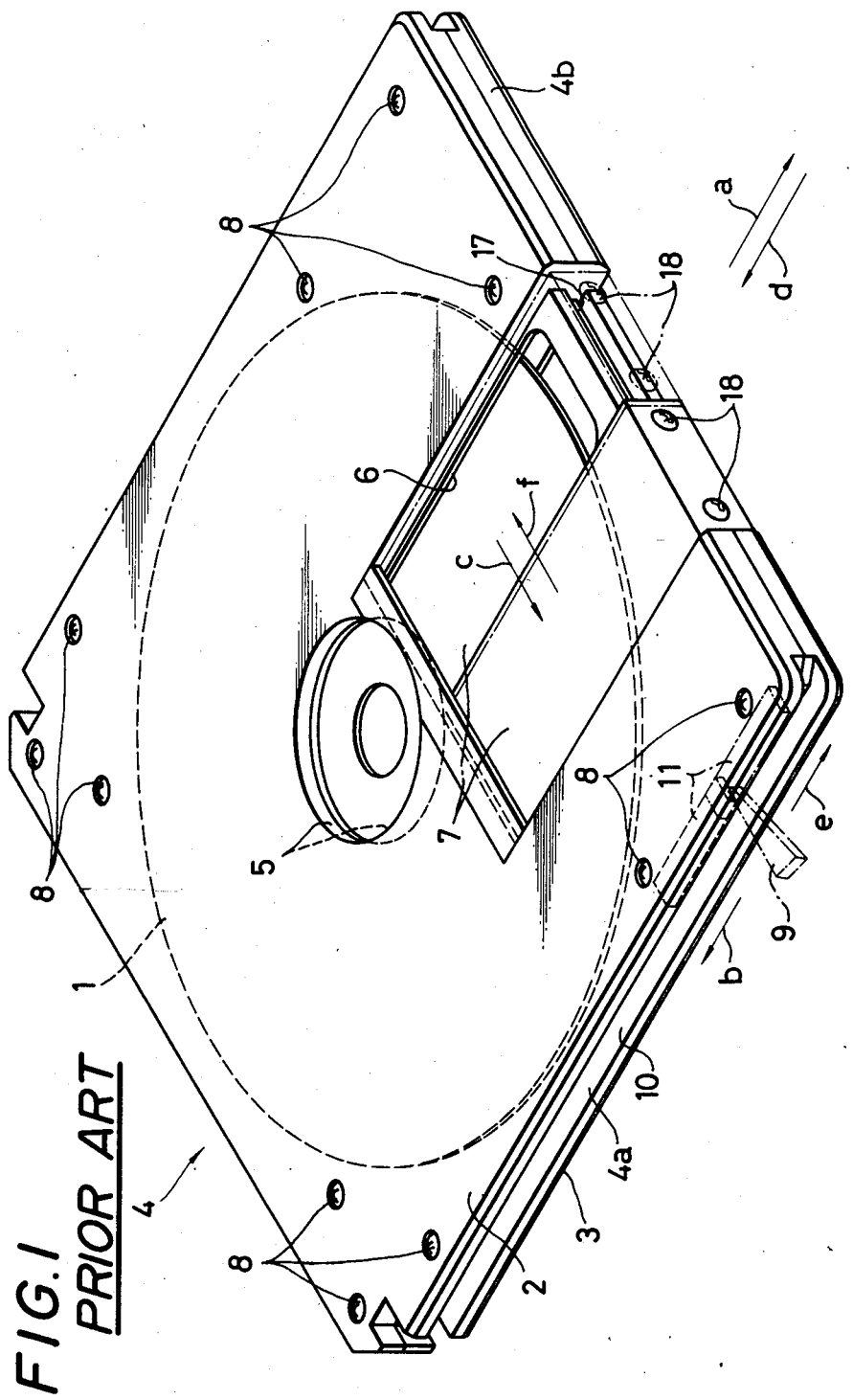
FIG. 1 is a perspective view of a disk cartridge disclosed in the prior application.
Figure 2:
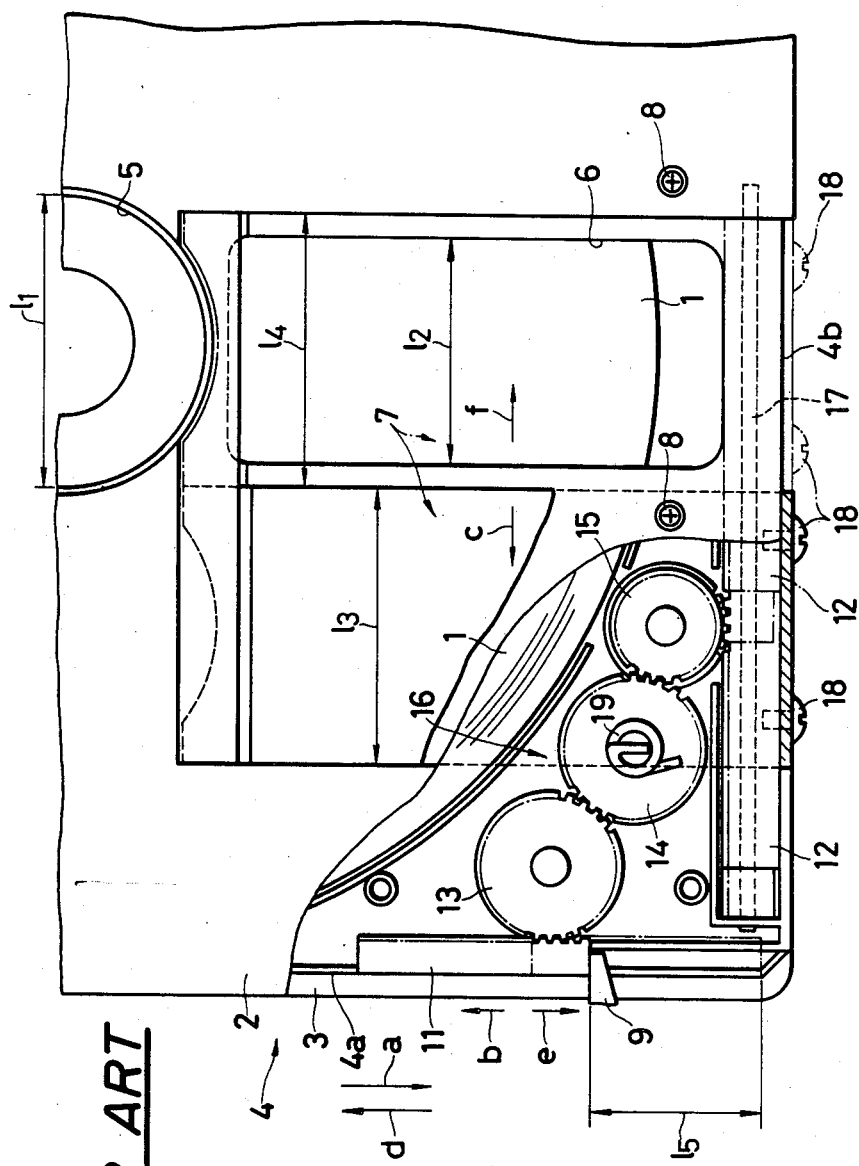
FIG. 2 is a plan view of the essential part of the disk cartridge shown in FIG. 1.

An embodiment, wherein the present invention is applied to a disk cartridge including an optical disk or the like in which information can be inserted, will be described hereinafter referring to FIGS. 3 to 5. When the part of the constitution of the embodiment is the same as that of the prior art shown in FIGS. 1 and 2, the reference numerals common with the prior art will be used and the description thereof will be omitted.

Figure 3:
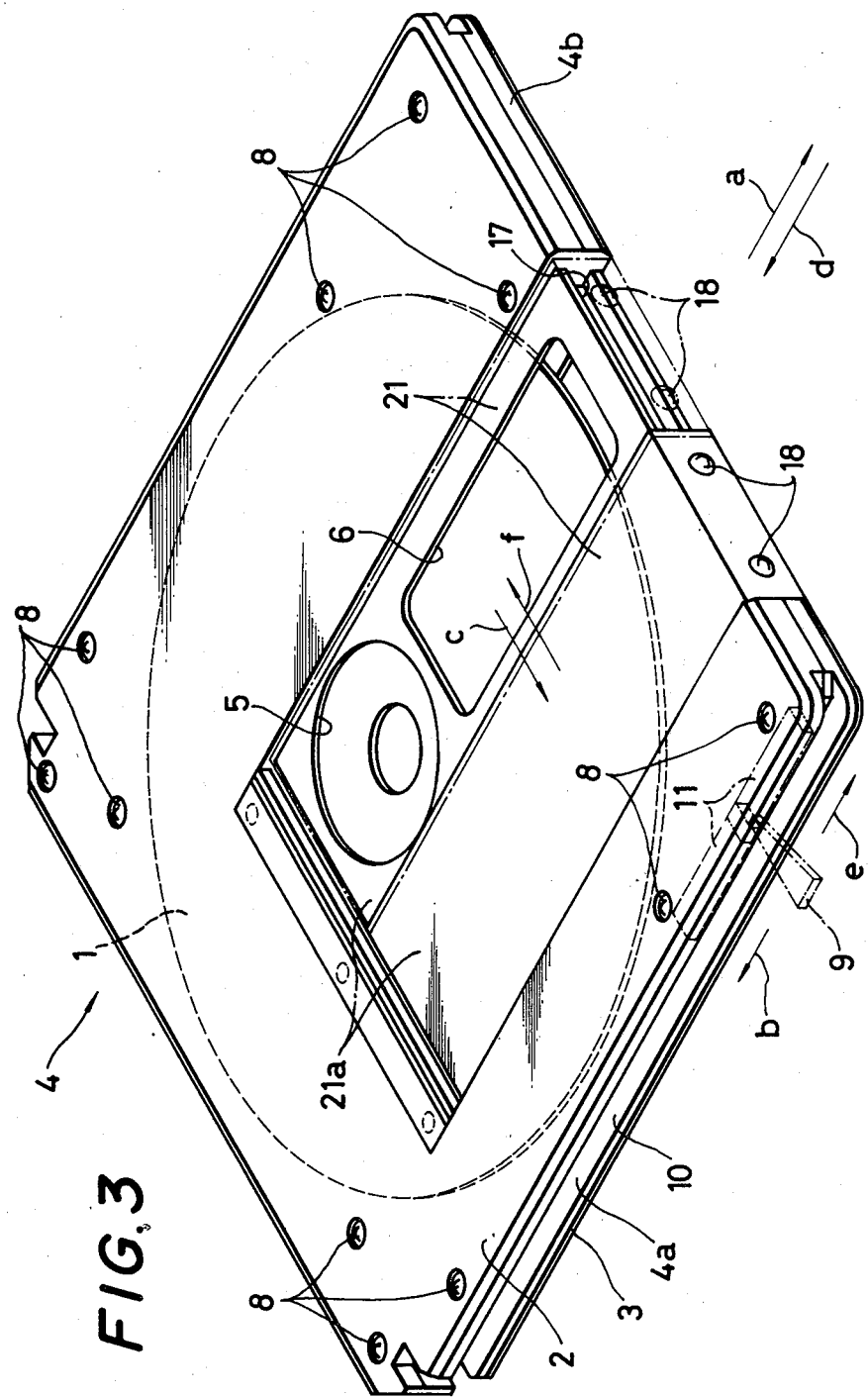
FIG. 3 is a perspective view of the disk cartridge according to an embodiment of this invention.
Figure 5:
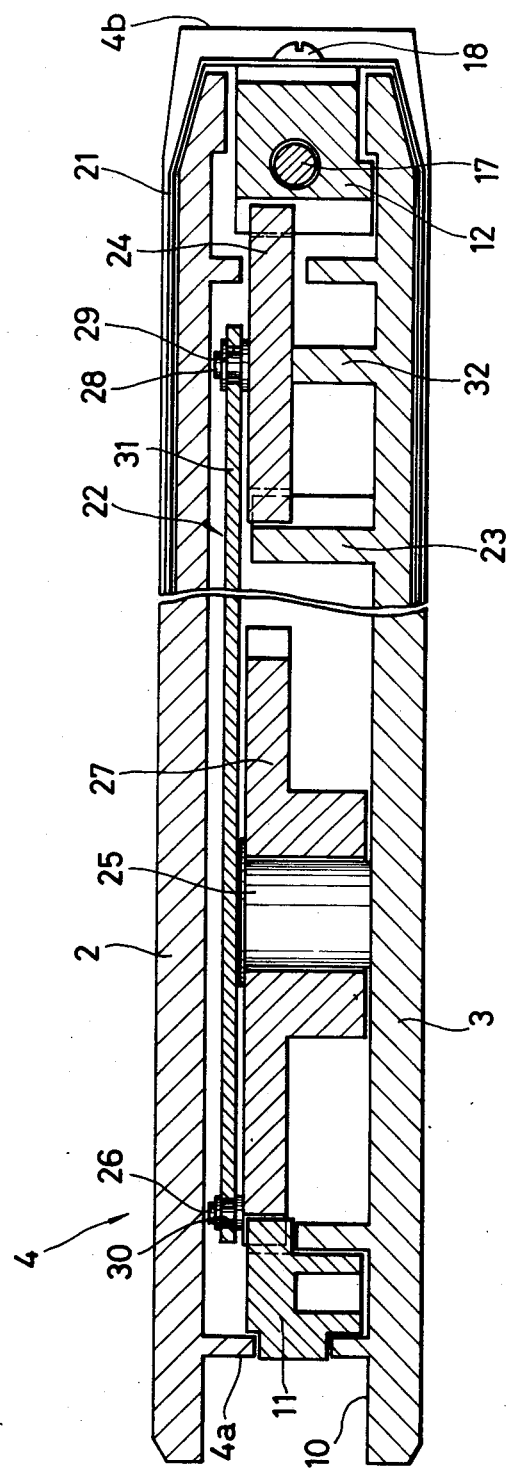
FIG. 5 is a developed sectional view of the essential part of the disk cartridge shown in FIG. 3.

Like the shutter 7 above-mentioned, a shutter 21 of the embodiment is made of a metal plate, such as a stainless steel plate or the like and shaped into almost the letter U in cross section as illustrated in FIG. 5, but the both ends 21a of the shutter 21 are so extended as to cover a turn table insertion openings 5 together with an optical head insertion openings 6 as illustrated in FIG. 3. Thus, the disk cartridge can be completely closed.

Figure 4:
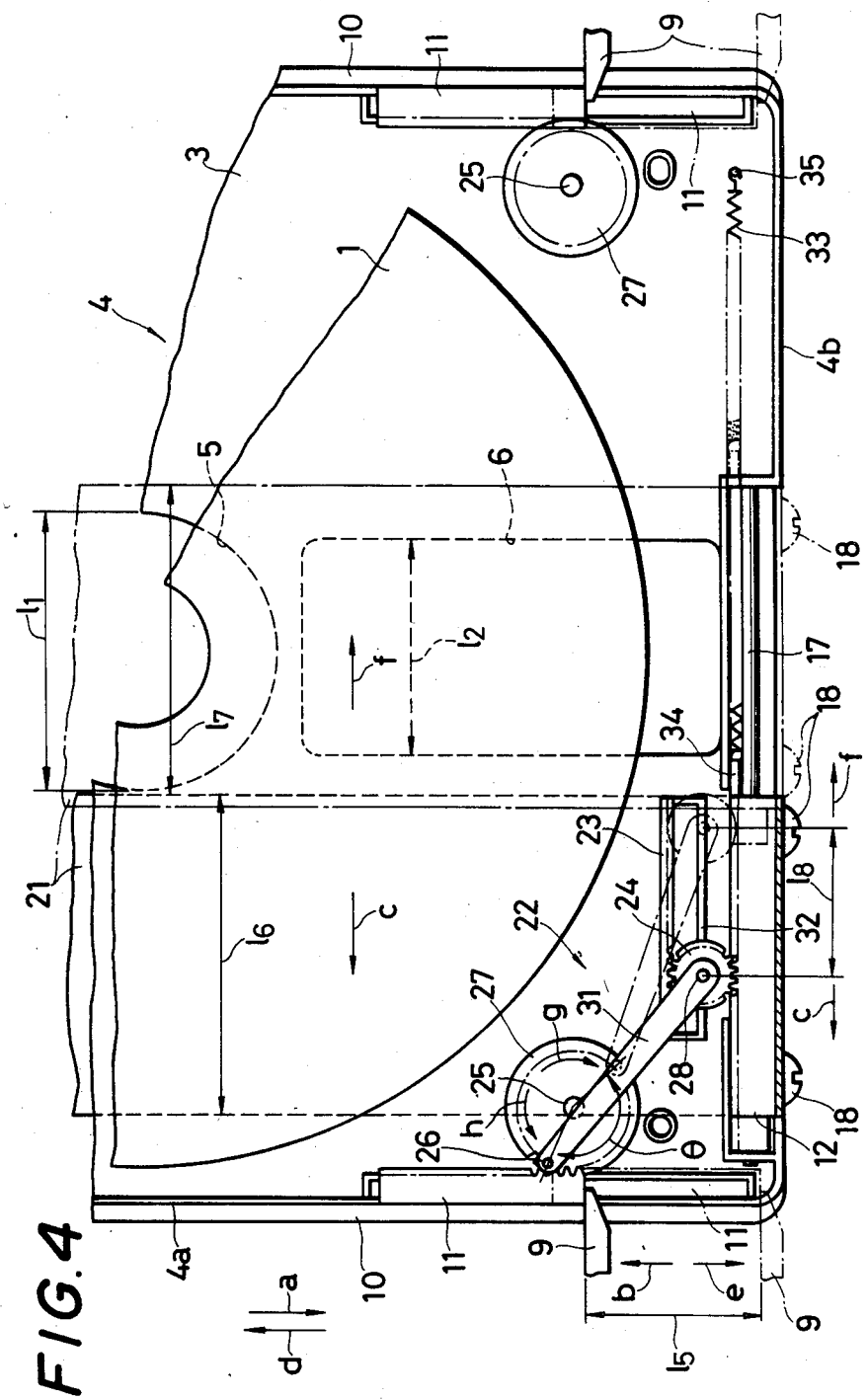
FIG. 4 is a plan view of the essential part of a disk cartridge shown in FIG. 3.

The width $l_6$ of the shutter 21 in FIG. 4 is made so large as to be able to cover the turn table insertion opening 5, the width (the diameter) $l_1$ of which is larger than the width $l_2$ of the optical head insertion opening 6, so that the stroke $l_7$ of the shutter 21 from its closed position indicated in chain-dotted lines to its opened position indicated in solid lines in FIG. 4 becomes larger than the stroke $l_4$ of the shutter 7. The shutter 21 is secured to the second rack 12 with screws 18 like the shutter 7 is, and as for the stroke $l_5$ of the first rack 11, there is no difference between the disk cartridges shown in FIGS. 1 and 3. That is, a new transmission mechanism 22 shown in FIGS. 4 and 5 is used in this invention without changing the stroke $l_5$ of the first rack 11.

The transmission mechanism 22 comprises a third rack 23 placed opposite to and in parallel with the second rack 12 and fixed to the cartridge 4 therewithin, a second pinion 24 meshed with both the second rack 12 and third rack 23 and moved along the fixed third rack 23, a first pinion 27 with an eccentric pin 26 which is rotatably mounted on the cartridge 4 therewithin through a shaft 25 and meshed with the first rack 11, and a rod 31 connecting the shaft 28 of the second pinion 24 with the eccentric pin 26 of the first pinion 27, the shaft 28 and eccentric pin 26 being fitted into respective holes 29, 30 provided at each end of the rod 31.

The third rack 23 and a guide rail 32 which is disposed in parallel with the third rack 23 and opposite to the pinion 24 are formed integrally with the lower half 3 made of, for example, synthetic resin, such as polycarbonate resin, and the eccentric pin 26 and shaft 28 are also formed integrally with the respective pinions 27 and 24 made of, for example, synthetic resin. Further, a tension coiled spring 33 is used as a return spring for the shutter 21 because the stroke $l_7$ of the shutter 27 becomes larger. The ends of the return spring 33 are hooked to respective end catches 34 and 35 formed integrally with the second rack 12 and the lower half 3. As illustrated in FIG. 4, when the first rack 11 is slidingly moved with constant stroke $l_5$ by the projection 9 in the direction of arrow b from the returned position indicated in chain-dotted lines to the advanced position indicated in solid lines, the eccentric pin 26 on the pinion 27 is swung on the shaft 25 at angle $\theta$ in direction of arrow g and thereby, the pinion 24 is moved in the direction of arrow c through the rod 31.

As the pinion 24 is rotated by the fixed third rack 23, when moved by length $l_8$ in the direction of arrow c from the returned position indicated in solid lines to the advanced position indicated in chain-dotted lines in FIG. 4, the second rack 12 is slidingly moved against the force of the return spring 33 in the direction of arrow c from the returned position indicated in chain-dotted lines to the advanced position indicated in solid lines, so that the shutter 21 is also moved in the direction of arrow c from the closed position indicated in chain-dotted lines to the opened position indicated in solid lines. Thus, it is possible to design the transmission mechanism 22 in such a way that the stroke $l_7$ of the second rack 12 is twice as large as the stroke $l_8$ of the pinion 24.

When the projection 9 is moved in the direction of arrow e to be separated from the first rack 11, the shutter 21 is moved in the direction of arrow f by the force of the return spring 33 and simultaneously, the second rack 12, pinion 24, rod 31, pinion 27 and first rack 11 are moved in the directions of arrow f, h and e, respectively.

According to this invention, it is easy to move the large shutter 21 under the large stroke $l_7$ without changing the stroke $l_5$ of the first rack 11 and the size of the cartridge 4 so as to enable the shutter 21 to cover both the turn table insertion openings 5 and optical head insertion openings 6. Hence, the disk cartridge is completely closed when out of use, so that it does not occur that dust or the like is entered in the cartridge 4 through the openings 5 and 6, and adheres to the surface of the disk 1. In addition, the length of the third rack 23 can be almost half of the length of the second rack 12 and the diameter of the pinion 24 can be also diminished.

Having described an illustrative embodiment of this invention with reference to the accompanying drawings, it is to be understood that the invention is not limited to that precise embodiment, and that various changes and modifications may be effected therein. For example, the disk can be not only a double side recording disk but also a single side recording disk and further, the disk cartridge includes not only an optical disk or the like in which information is inserted but also all sorts of recording and/or reproducing disks.

What is claimed is:

1. In a disk cartridge, wherein a disk used as a recording medium is accommodated in a cartridge comprising an upper half and a lower half, a first rack and a second rack are so provided as to be slidingly movable along respective sides of the cartridge, which are perpendicular to each other, a transmission mechanism provided within the cartridge links the first rack with the second rack, a shutter is secured to the second rack, and at least recording head or reproducing head insertion openings of the cartridge are opened and closed by the shutter as the second rack is moved through the transmission mechanism by the first rack operated by an external force, the improvement in which said transmission mechanism comprises a third rack fixed in said cartridge in parallel with and opposite to said second rack, a second pinion meshed with both said second rack and said third rack and movable along said fixed third rack, a first pinion meshed with said first rack, rotatably mounted in said cartridge and having a eccentric pin, and a rod connecting said eccentric pin with the shaft of said second pinion.

2. A disk cartridge according to claim 1, characterized in that said shutter is made so large as to simultaneously cover said head insertion openings and turn table insertion openings.

3. A disk cartridge according to claim 1, characterized in that said shutter is made of a metal plate in the shape of the letter U in cross section and secured to said second rack with screws.

4. A disk cartridge according to claim 1, characterized in that said second rack is urged backward by a return spring, which is a tension coiled spring.

5. A disk cartridge according to claim 1, characterized in that said second rack is guided by a guide shaft made of a metal bar.

6. A disk cartridge according to claim 1, characterized in that said first rack is pushed to open said shutter by a projection provided in a disk player when the disk cartridge is inserted in said disk player from a side near said shutter.

* * * * *